Patented Feb. 6, 1951

2,540,642

UNITED STATES PATENT OFFICE 2,540,642

MULTIPLE COMBUSTION CHAMBER TORCH IGNITER AND AUXILIARY FUEL SPRAY DEVICE ARRANGEMENT FOR INITIATING COMBUSTION

Sidney Allen and Morris A. Stokes, Coventry, England, assignors to Armstrong Siddeley Motors Limited, Coventry, England Application February 4, 1948, Serial No. 6,214
In Great Britain June 19, 1947

4 Claims. (Cl. 60—44)

This invention relates to a combustion chamber unit of an internal-combustion turbine plant, of the kind comprising a circle of elongated, longitudinally-extending combustion chambers which are placed in communication with one another by means of lateral passages, each combustion chamber having a normal fuel supply means operating at a relatively-low pressure—for example, a pressure of about fifteen pounds per square inch above the air pressure in the chamber in full throttle conditions as compared with a high pressure atomising system at a pressure of 1,000 pounds per square inch or higher.

The problem is to initiate combustion in the different chambers when starting up the turbine plant. Ignition could be ensured by the use of what is commonly called a torch igniter in each chamber, namely, an auxiliary fuel spray device associated with an electric sparking plug, the auxiliary fuel being delivered to the spray device at a relatively-high pressure (i. e., at a pressure which is high compared with the pressure of the normal fuel supply means when starting up the engine); but such igniters are both costly and heavy, so that it is impracticable to provide one for each chamber.

The present invention consists in providing, for starting-up purposes, at least one chamber with a torch igniter as aforesaid, whilst each of the chambers having no torch igniter is provided with a relatively-high pressure auxiliary fuel spray device, as aforesaid, disposed so that the auxiliary fuel spray in a chamber will be ignited by the burning mixture passing through one of the lateral passages from an adjacent chamber in which ignition has already been effected. As soon as all the chambers are ignited the auxiliary fuel spray devices are cut off and the chambers are supplied normally, i. e., with liquid fuel at the relatively-low pressure difference, such liquid fuel being vaporised within the chamber to ensure combustion taking place in a relatively-short length of chamber.

It may here be mentioned that a different kind of combustion chamber unit is one in which the liquid fuel is normally sprayed into each chamber at a very high pressure, e. g., at a pressure of 1,000 pounds per square inch or higher, and it is customary with such a combustion chamber unit to provide two opposite chambers with electric sparking plugs or torch igniters disposed in the paths of the fuel sprays in the chambers, the lateral passages being placed so that, when combustion is effected in one chamber, the burning gases passing through the lateral passages provide flames in the paths of the fuel sprays in the adjacent chambers—thus to complete ignition in all the chambers very rapidly in suitable conditions, i. e., at sea level. However, at high altitudes the necessary high spray pressures may not be available, and in these conditions difficulties are often encountered and ignition becomes uncertain.

Figure 6:
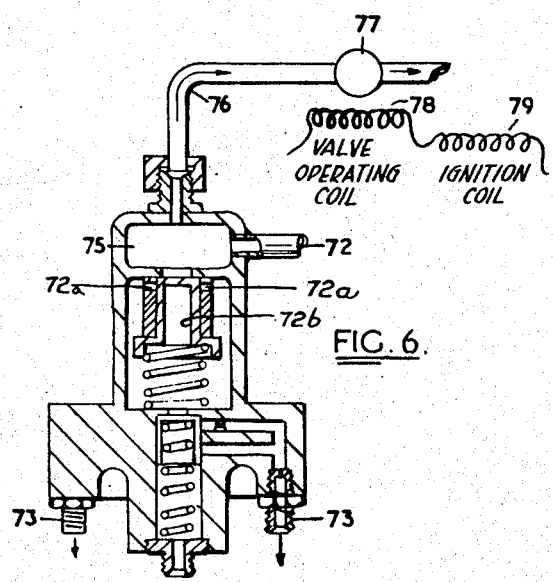
Figure 5:
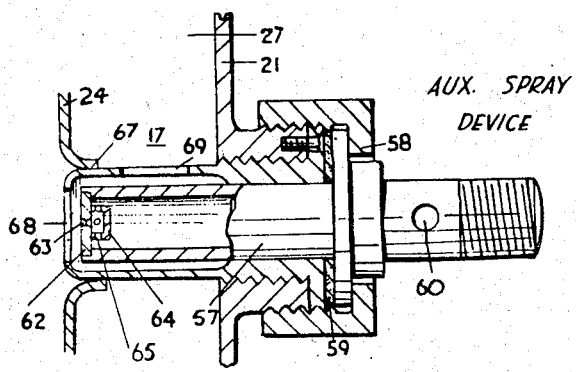

Figure 5 is a sectional elevation of a suitable auxiliary spray device when fitted into a combustion chamber casing, this view also being to the same larger scale; and Figure 6 is a sectional view of a pressure regulating valve means adapted to supply fuel to the auxiliary spray devices, when starting up the unit, at a higher pressure than that at which it supplies the fuel to the main burners the figure also showing diagrammatically control means for the fuel supply passage for the auxiliary spray devices.

Figure 1:
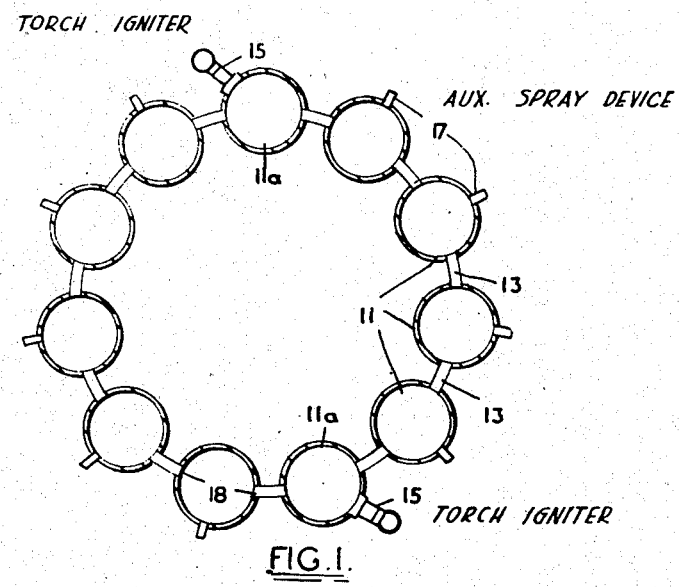
Figure 1 is a diagrammatic cross-sectional view of a combustion chamber unit, for an internal-combustion turbine plant, arranged according to the invention.
Figure 2:
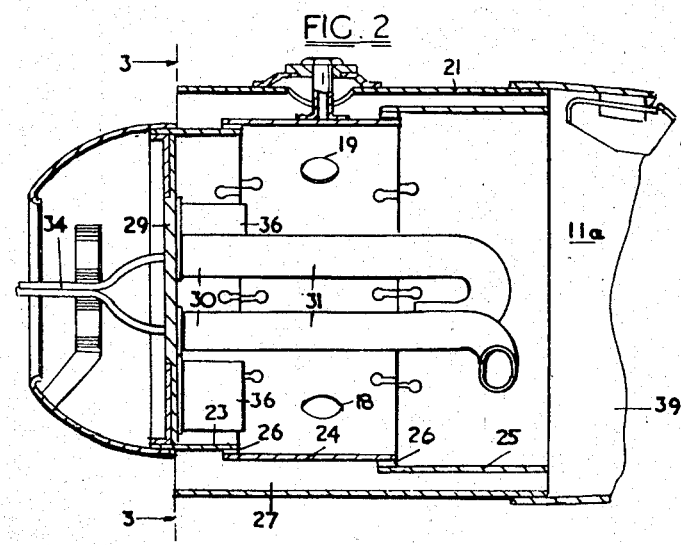
Figure 2 is a longitudinal section of one form of combustion chamber such as forms part of the combustion chamber unit of Figure 1, the section being taken on the line 2—2 of Figure 3.
Figure 3:
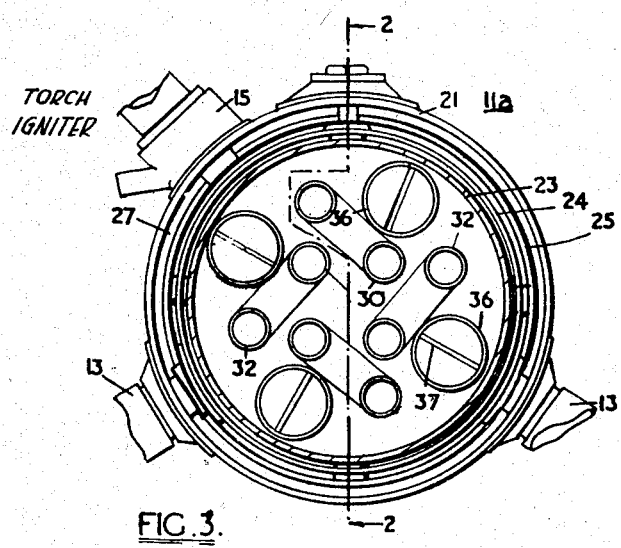
Figure 3 is a cross-section taken on the line 3—3 of Figure 2 but omitting the baffle.

The drawings show in Figure 1 a combustion chamber unit comprising eleven combustion chambers 11 which are substantially similar and each of which may take the form of that shown by Figures 2 and 3, each being an elongated one arranged longitudinally, all being in a circle about the axis of the internal-combustion turbine plant, not shown. Each adjacent pair of combustion chambers is joined together by a lateral passage 13.

In the present instance two opposite combustion chambers 11a, 11a, are provided with torch igniters indicated at 15, the use of two torch igniters being preferable in case one should fail. As stated, these torch igniters are well-known in practice, each comprising an electric sparking plug and a passage along which fuel can be delivered at an appropriate high pressure, as aforesaid, to be ignited by the spark.

Each of the rest of the combustion chambers 11 is fitted with an auxiliary spray device, indicated at 17, 17. These should be positioned, as should also the torch igniters, substantially in the plane of the centre lines of the lateral passages 13, 13, i. e., of the centres of the openings 18, 18 for the lateral passages. The torch igniters are shown as being inclined at unsymmetrical angles to the lines joining the centres of the openings, for the lateral passages 13, 13, of the combustion chambers with which the torch igniters are associated, but this is by no means essential. (Figure 2 shows an opening 19 for the torch igniter 15.) It is, however, preferable to dispose each auxiliary fuel spray device 17 symmetrically with respect to the two associated lateral passages.

As stated, each combustion chamber is an elongated one, operating on the vaporizing system, and satisfactory forms of combustion chamber are disclosed in the specifications of United States Patent No. 2,438,858, and of United States patent applications Serial Nos. 727,509 and 781,583. Another satisfactory form for the combustion chamber is that disclosed by United States Patent 2,522,081, as illustrated in Figures 2 and 3 of the accompanying drawings. This combustion chamber comprises an outer casing of which part is shown at 21 in the drawings, and along and within which air from the compressor of the turbine plant is delivered, from left to right in Figure 2. Disposed in the interior of the outer casing is an inner casing comprising three over-lapping sections 23, 24 and 25 which are radially spaced slightly from one another, as indicated at 26, 26, to allow some of the diluent air, passing along the space 27, to enter into the interior of the flame chamber provided by the said inner casing, with a view to heat-insulating the inner casing portions 24, 25. The inlet end of the inner casing is closed by a baffle 29 which has in it a circle of holes to receive the inlet ends 30 of J-like pipes 31, the outlet ends 32 of these being turned round through 180° and directed towards parts of the baffle between the circle of inlet holes therein. The J-like pipes carry the primary air for combustion purposes, the fuel being injected into their inlet ends 30 from main supply pipes 34, at a relatively-low pressure, e. g., at a pressure up to about ten pounds per square inch.

Secondary air, for enabling combustion to be substantially completed within the interior of the inner casing, is supplied by fish-tail type nozzles 36 mounted in the baffle 29 and having nozzle openings 37 which are shown as extending substantially radially of the combustion chamber and substantially mid-way between the outlet ends 32, 32 of the J-like pipes 31.

The products of combustion issuing from the inner casing, and combustion is substantially completed within the inner casing, mix in the chamber 39 with the rest of the diluent air passing along the annular passage 27, and are passed to the turbine in a usual manner.

Figure 4:
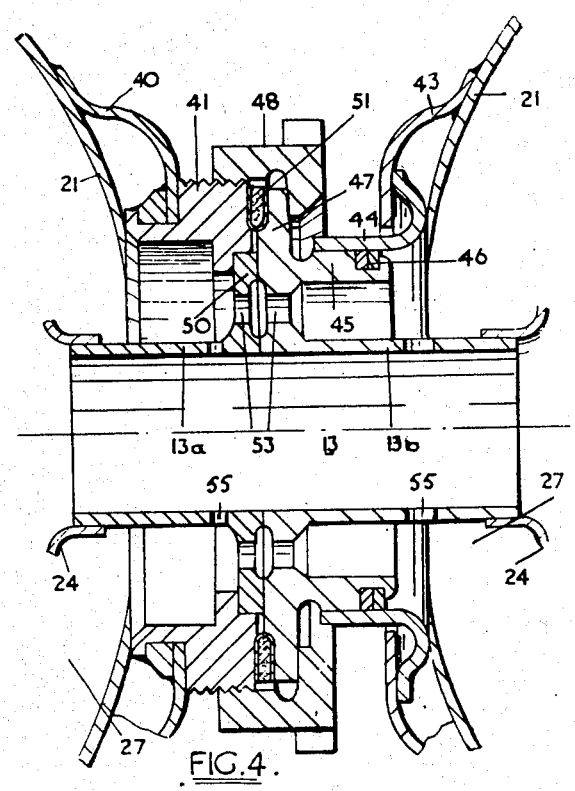
Figure 4 is a fragmentary sectional view, to a larger scale, showing one of the interconnecting lateral passages and the associated parts between two adjacent combustion chambers.

One satisfactory form of interconnecting passage 13 is shown by Figure 4, the passage actually extending, as will be clear from Figures 2 and 3, from the interior of the inner casing portions 24 of two adjacent combustion chambers 11. The outer casing 21 of one of these has welded or otherwise rigidly secured to it a flange 40 to which is welded or otherwise rigidly secured an externally-threaded sleeve 41. The other outer casing 21 has rigidly secured to it a similar flange 43 to which is welded or otherwise secured a sleeve 44. A hollow plunger 45, carrying a packing 46 to coact with the bore of the sleeve 44, has a flange 47 which can be drawn up axially, by means of a flanged nut 48 screwed upon the sleeve 41, against a flange 50, and a sealing ring 51 is interposed between a flange 47 and the adjacent end of the sleeve 41. The flange 50 is the flange of a tubular portion 13a slidingly fitted, at its end remote from the flange 50, to the adjacent inner casing 24. The plunger 45 and flange 47 are fast with a tubular portion 13b slidingly fitted at its other end to the adjacent inner casing portion 24. This construction allows of the expansion of the two combustion chambers as working temperatures are being reached.

In the present instance, openings 53, 53 are provided through the flange 50 and the head of the plunger 45 to allow diluent air in the annular spaces 27, 27 to pass freely therebetween, thus to give a pressure balance and, in addition, to heat-insulate the tube portions 13a, 13b. Openings 55, 55 are provided in the tube portions 13a, 13b to allow some of such diluent air to enter the passage 13.

Figure 5 shows a preferred form of auxiliary spray device 17 which, in the present instance, is carried by the outer casing portion 21 and extends into the inner casing portion 24. The spray device comprises a body 57 located by means of a nut 58 and an interposed packing 59, and fuel at a relatively-high pressure (as aforesaid) is supplied to the hollow interior of the body through an inlet hole 60 from a known form of supply coupling. The other end of the body has in it a plug 62 with a central spray hole 63 communicating with the interior of a cup 64 provided with a plurality of tangentially disposed holes 65, such that fuel in the hollow interior of the body 57 entering the cup 65 will swirl in the interior thereof on its way to the spray nozzle 63 from which it emerges in the form of a fine spray.

The body 57 is protected by a tubular guard 67 having an outlet opening 68, for the fuel spray, and an inlet opening 69 through which cooling air enters from the space 27 to mingle with the spray jet.

Figure 6 shows a pressure regulating valve means to which fuel is supplied along a pipe line 72 from a pump (not shown) driven by the turbine plant. The plunger 72b of this valve means may be set to open, say, at a pressure of fifty pounds per square inch, but it offers a pressure drop of about fifty pounds per square inch, due mainly to the restriction provided by the plunger coacting with the small ports 72a. Consequently, when starting up the plant, the flow along the pipe line 72 gradually increases, and it is only when a pressure in excess of fifty pounds per square inch is reached that the valve begins to deliver fuel from the outlets 73, 73 to the main fuel supply pipes 34, at a pressure just above atmospheric, and reaching the maximum, say, of ten pounds per square inch in idling conditions—in which conditions, it will be appreciated, the air pressure in the combustion chamber is substantially only atmospheric. As will be well understood, when the plant is accelerated from idling conditions, the air pressure in the combustion chamber rises very considerably, and naturally the injection pressure of the fuel must always be in excess of the air pressure, being approximately, say, 15 pounds per square inch in excess thereof in full throttle conditions.

In the present instance, however, the supply chamber 75 of the valve is additionally connected to a pipe line 76 by means of which the auxiliary spray devices 17 and the two torch igniters 15 can be supplied with fuel when starting up. The supply passage 76 is shown as being provided with a valve 77 which is electro-magnetically operated, the operating coil 78 being connected via the switch (not shown) which supplies an ignition coil 79 by which the spark plugs of the torch igniters are electrically supplied. The arrangement is such that, when the circuit for the coil 79 is closed (when starting up), the valve 77 is automatically opened and fuel is immediately delivered along the pipe line 76 to the various auxiliary spray devices 17 and to the two torch igniters, such fuel being at a pressure which increases as the delivery along the pipe 72 increases, i. e., as the speed of the plant and the pump increase. When the fuel pressure supplied to the chamber 75 (and to the auxiliary spray devices) exceeds the fifty pounds per square inch, the main fuel supply to the combustion chambers 11 will also take place along the pipes 34, as previously stated, at the relatively low pressure. Once the plant is operating the ignition coil 79 is disconnected and the valve 77 automatically closes, leaving the combustion chambers to be supplied with fuel to the inlet ends 30 of the J-like pipes in a usual manner.

When starting up, the flaming mixture from the two torch igniters 15 quickly effects ignition of the main fuel supply in the two chambers 11a, and on combustion taking place in these the flaming mixture passing through the adjacent lateral passages 13 immediately ignites the auxiliary fuel sprays from the devices 17 in the next chambers 11, and so on.

By the invention the whole of the combustion chamber unit can be set into operation in a very short time, and ignition is effectively ensured whether the turbine plant is on the ground or operating at high altitudes.

What we claim as our invention and desire to secure by Letters Patent of the United States is:

1. A liquid fuel combustion chamber unit, for an internal-combustion turbine plant, comprising a circle of elongated, longitudinally extending combustion chambers, means providing lateral passages placing said chambers in communication with one another, each of said chambers having a normal fuel supply means to operate at a relatively-low pressure which is above the air pressure in said chamber, at least one of said chambers having a torch igniter, and each of said chambers which have no torch igniter having an auxiliary fuel spray device, and means for supplying said torch igniter and said auxiliary fuel spray devices with fuel at a relatively-high pressure, compared with that at which the main fuel supply is being delivered to said chambers, for starting up purposes, said auxiliary fuel spray devices being disposed so that the auxiliary fuel spray in a chamber will be ignited by the burning mixture passing through one of the lateral passages from an adjacent chamber in which ignition has already been effected.

2. A liquid fuel combustion chamber unit, for an internal-combustion turbine plant, comprising a circle of elongated, longitudinally extending combustion chambers, means providing lateral passages placing said chambers in communication with one another, each of said chambers having a normal fuel supply means including a pressure-regulating valve means adapted to provide a predetermined pressure drop whereby to supply fuel at a relatively-low pressure which is above the air pressure in the said chamber at least one of said chambers having a torch igniter and each of said chambers which have no torch igniter having an auxiliary fuel spray device, and means for supplying said torch igniter and said auxiliary fuel spray devices from the inlet side of said pressure-regulating valve means with fuel at a relatively high pressure, compared with that at which the main fuel supply is being delivered to said chambers, for starting up purposes, said auxiliary fuel spray devices being disposed so that the auxiliary fuel spray in a chamber will be ignited by the burning mixture passing through one of the lateral passages from an adjacent chamber in which ignition has already been effected.

3. A liquid fuel combustion chamber unit, for an internal-combustion turbine plant, comprising a circle of elongated, longitudinally extending combustion chambers, means providing lateral passages placing said chambers in communication with one another, each of said chambers having a normal fuel spray device, at least one of said chambers having a torch igniter, and each of said chambers which have no torch igniter having an auxiliary fuel spray device, a fuel supply means, a pressure-regulating valve means connected therewith, and connections from said valve means to each of said normal and auxiliary fuel spray devices and to said torch igniter to supply said torch igniter and said auxiliary fuel spray devices with fuel at a relatively-high pressure compared with that at which the main fuel supply is being delivered to said chambers for starting up purposes, and to supply said normal fuel spray devices with fuel at a relatively-low pressure, which is above the pressure in said chambers, for normal running, said auxiliary fuel spray devices being disposed so that the auxiliary fuel spray in a chamber will be ignited during starting up by the burning mixture passing through one of the lateral passages from an adjacent chamber in which ignition has already been effected.

4. A liquid fuel combustion chamber unit, according to claim 3, and including an electrically-operable valve controlling the supply of fuel to said torch igniter and said auxiliary spray devices, said electrically-operable valve having an operating winding in circuit with the ignition means by which the circuit of the torch igniter is supplied.

SIDNEY ALLEN.
MORRIS A. STOKES.

REFERENCES CITED

The following references are of record in the file of this patent:

UNITED STATES PATENTS

| Number | Name | Date |
| --- | --- | --- |
| 2,404,335 | Whittle | July 16, 1946 |